Patented Feb. 11, 1936

2,030,823

UNITED STATES PATENT OFFICE 2,030,823

NITROANTHRAQUINONE-AZOLES

Paul Nawiasky, Ludwigshafen-on-the-Rhine, Berthold Stein, Mannheim, and Erich Berthold and Robert Zell, Ludwigshafen-on-the-Rhine, Germany, assignors to General Aniline Works, Inc., New York, N. Y., a corporation of Delaware No Drawing. Application September 18, 1933, Serial No. 690,024. In Germany September 23, 1932

4 Claims. (Cl. 260—44)

The present invention relates to nitroanthraquinone-azoles, in particular nitroanthraquinone-oxazoles, -thiazoles and -imidazoles.

We have found that 1-nitroanthraquinone-2-azoles corresponding to the general formula

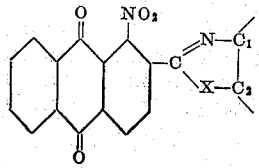

in which X stands for —O—, —S— or —NH—, wherein C₁ and C₂ belong to an anthraquinone nucleus and in which the anthraquinone radicles may be substituted, for example by halogen, amino, hydroxy or alkylated or arylated hydroxy groups, are valuable vat dyestuffs or intermediates of vat dyestuffs.

The said nitroanthraquinone-azoles may be produced by condensing a 1-nitroanthraquinone-2-carboxylic acid or a derivative thereof, in particular an acid halide thereof, especially the acid chlorides, with an aminoanthraquinone, substituted in the ortho position to the amino group by a hydroxy, mercapto or amino group. The condensation is carried out by heating up from about 100° to about 200° C. the two components, preferably in an inert organic solvent of a high boiling point, such as for example nitrobenzene, a chlorobenzene and naphthalene. When condensing in the beforementioned manner a 1-nitroanthraquinone-2-carboxylic acid with an o-amino-hydroxyanthraquinone at temperatures below about 150° C., the corresponding 1-nitroanthraquinone-2-carbonyl-amino-hydroxyanthraquinones are obtained which on further heating, preferably at higher temperatures, are converted into the corresponding 1-nitroanthraquinone-oxazoles. The ring closure to form the oxazoles may also be effected by heating the 1-nitroanthraquinone-2-carbonyl-amino-hydroxyanthraquinones with acid condensing agents capable of splitting off water, for example sulphuric acid, toluene-sulphonic acid and zinc chloride. When condensing, however, a 1-nitroanthraquinone-2-carboxylic acid, in particular an acid halide thereof, with an amino-anthraquinone substituted in the ortho position to the amino group by an amino or mercapto group, generally speaking, the corresponding acylamines are not formed, but water is split off simultaneously and the nitroanthraquinone-imidazoles and thiazoles are directly obtained.

The following examples will further illustrate how the invention is carried out in practice, but the invention is not restricted thereto. The parts are by weight.

Example 1

32 parts of 1-nitroanthraquinone-2-carboxylic acid chloride are heated at about 150° C. in 300 parts of nitrobenzene with 24 parts of 2-amino-3-hydroxyanthraquinone until uniform greenish yellow crystals are produced. After cooling the reaction mixture, the 1-nitroanthraquinone-2-carbonyl-amino-2′.3′-hydroxyanthraquinone obtained in an excellent yield and in a very pure form is filtered off and worked up in the usual manner. It dissolves in concentrated sulphuric acid to give a yellow solution.

50 parts of the product thus obtained are dissolved in 750 parts of concentrated sulphuric acid and the solution is heated for about 1 hour at about 90° C. By the addition of a restricted amount of water or dilute sulphuric acid the sulphate of 1-nitroanthraquinonyl-2′.3′-oxazole is separated in the form of colorless needles which are filtered off and decomposed by means of water. The 1-nitroanthraquinonyl-2′.3′-anthraquinone-oxazole probably corresponding to the formula

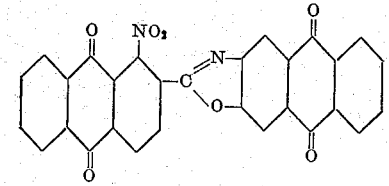

obtained dissolves in concentrated sulphuric acid to give an orange solution.

Example 2

32 parts of 1-nitroanthraquinone-2-carboxylic acid chloride are heated for 2 hours at about 150° C. with 24 parts of 1-amino-2-hydroxyanthraquinone. The 1-nitroanthraquinone-2-carbonyl-amino-1′.2′-hydroxyanthraquinone thus produced forming faintly yellow crystals is filtered off. It dissolves in concentrated sulphuric acid to give a golden yellow solution.

10 parts of the product thus obtained are heated at about 195° C. for about 1 hour in 150 parts of 96 per cent sulphuric acid. By the addition of a restricted amount of water the sulphate of 1-nitroanthraquinonyl - 2'.1'-anthraquinone-oxazole probably corresponding to the formula

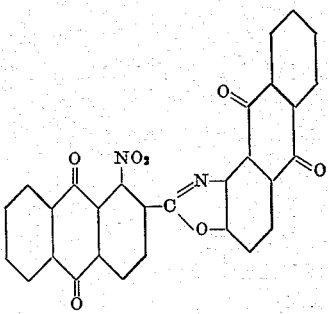

is separated in the form of colorless needles. It dissolves in concentrated sulphuric acid to give a yellow solution with a reddish tinge.

Example 3

32 parts of 1-nitroanthraquinone-2-carboxylic acid chloride are heated at about 150° C. for about 2 hours with 27.4 parts of a mixture consisting mainly of 2-amino-3-hydroxy-6-chloroanthraquinone and the corresponding isomeric product containing the chlorine atom in the 7-position in 300 parts of nitrobenzene. The said mixture of chloro-2-amino-3-hydroxy-anthraquinones may be obtained by condensing 4-chlorophthalic acid anhydride with monochlorobenzene, nitrating the product, replacing one chlorine atom by a hydroxy group by the action of a dilute caustic alkali solution, reducing the product, treating the reduction product with phosgene, closing the ring by means of concentrated sulphuric acid and saponifying the product by means of dilute sulphuric acid. The 1-nitroanthraquinone - 2 - carbonyl-amino-2'.3'-hydroxy-6'-chloroanthraquinone together with the corresponding product containing chlorine in the 7-position obtained in a good yield and pure form dissolves in concentrated sulphuric acid to give an orange solution.

5 parts of the product thus obtained are heated at between 190° and about 200° C. in 50 parts of nitrobenzene after the addition of 3 parts of paratoluene sulphonic acid until initial material cannot any more be detected and uniform nearly colorless crystals of a good yield of a pure mixture of 1-nitroanthraquinonyl-2'.3'-anthraquinone-oxazole containing chlorine in the 6'-position and the corresponding oxazole containing chlorine in the 7'-position is obtained. The mixture dissolves in concentrated sulphuric acid to give a yellow solution with a reddish tinge.

Example 4

31.5 parts of 1-nitroanthraquinone-2-carboxylic acid chloride are heated at between about 190° and about 195° C. with 26 parts of 1-mercapto-2-aminoanthraquinone in 630 parts of trichlorobenzene until the amount of precipitating faintly yellow needles does not any more increase. The reaction mixture is then allowed to cool to between about 100° and about 130° C. and the reaction product recovered in the usual manner for example by filtration and treating the filter cake with steam. The 1-nitroanthraquinonyl 1'(S).2'-anthraquinone-thiazole probably corresponding to the formula

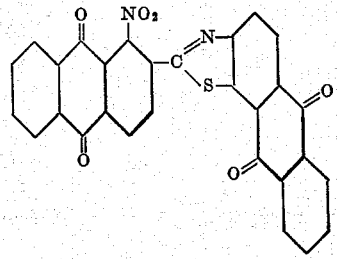

is thus obtained in the form of a loam yellow crystalline powder and dissolves in concentrated sulphuric acid to give a golden yellow solution.

Example 5

31.5 parts of 1-nitroanthraquinone-2-carboxylic acid chloride are heated at between about 180° and about 185° C. with 26 parts of 1-amino-2-mercapto-anthraquinone in 630 parts of trichlorobenzene until the amount of nearly colorless needles separating from the reaction mixture does not any more increase. The reaction mixture is then allowed to cool to about 120° C. and the difficultly soluble product recovered in the usual manner. The 1-nitroanthraquinonyl-1'.2'(S)-anthraquinone-thiazole thus obtained dissolves in concentrated sulphuric acid to give a golden yellow solution.

When employing 2-mercapto-3-aminoanthraquinone instead of 1-amino-2-mercaptoanthraquinone the corresponding 1-nitroanthraquinonyl-2'S.3'-anthraquinone-thiazole is obtained.

Example 6

32 parts of 1-nitroanthraquinone-2-carboxylic acid chloride are heated at about 200° C. with 24 parts of 2.3-diaminoanthraquinone in 500 parts of nitrobenzene until initial material cannot any more be detected which is the case after about 4 to 5 hours. The reaction product is filtered off and worked up in the usual manner. The 1-nitroanthraquinonyl - 2'.3' - anthraquinone-imidazole probably corresponding to the formula

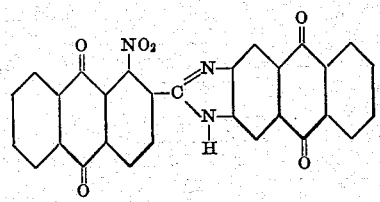

obtained in the form of yellowish-white leaflets dissolves in concentrated sulphuric acid to give a yellow red solution.

The corresponding 1-nitroanthraquinonyl-1.'2'-anthraquinone-imidazole is obtained in an analogous manner by employing 1.2-diaminoanthraquinone instead of 2.3-diaminoanthraquinone.

Example 7

32 parts of 1-nitroanthraquinone-2-carboxylic acid chloride are heated at about 150° C., while stirring, with 25.5 parts of 1-amino-2.4-dihydroxyanthraquinone in 300 parts of nitrobenzene until uniform crystals of 1-nitroanthraquinone-2-carbonyl-amino-1'.2'.4'-dihydroxyanthraquinone are formed. The reaction mixture is worked up in the usual manner and an excellent yield of pure 1-nitroanthraquinone-2-carbonyl-amino-1'.2'.4'-dihydroxyanthraquinone is obtained in the form of orange yellow crystals which dissolve in concentrated sulphuric acid to give a yellow red solution.

10 parts of the product thus obtained are heated to at between about 180° and 190° C. in 100 parts of nitrobenzene with 8 parts of para-toluene sulphonic acid until unconverted initial material cannot any more be detected under the microscope. The reaction product is filtered off and freed from nitrobenzene and para-toluene sulphonic acid by washing with methanol. The 1-nitroanthraquinonyl-2'.1'.4'-hydroxyanthraquinone-oxazole probably corresponding to the formula

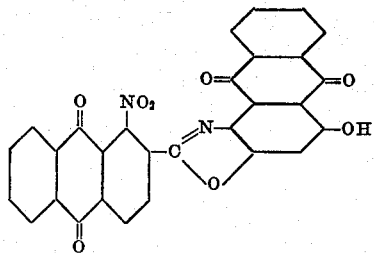

forming brown crystals dissolves in concentrated sulphuric acid to give a reddish yellow solution.

What we claim is:—

1. The 1-nitroanthraquinone-oxazole corresponding to the formula

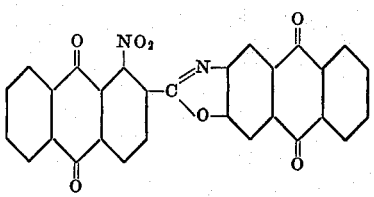

2. The mixture of 1-nitroanthraquinone-oxazoles containing chlorine in the 6'-position and the 7'-position respectively, of which the former corresponds to the formula

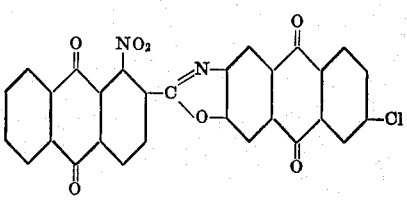

and the latter to the formula:

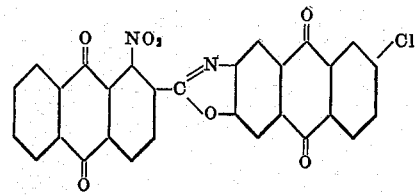

3. Compounds of the group consisting of 1-nitroanthraquinone-azoles corresponding to the formula

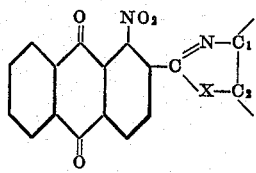

in which X stands for a member of the group consisting of —O—, —S— and —NH— and $C_1$ and $C_2$ are members of an anthraquinone nucleus standing in ortho position to each other, and such aforementioned nitroanthraquinone-azoles wherein the anthraquinone nucleus is substituted by a substituent selected from the group consisting of halogen, and the hydroxy group.

4. Compounds of the group consisting of 1-nitroanthraquinone-azoles corresponding to the formula

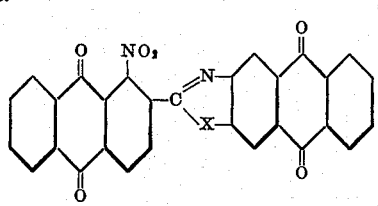

in which X stands for a member of the group consisting of —O—, —S— and —NH— and such aforementioned nitroanthraquinone-azoles wherein the anthraquinone nucleus free from the nitro group is substituted by a substituent selected from the group consisting of halogen, and the hydroxy group.

PAUL NAWIASKY.
BERTHOLD STEIN.
ERICH BERTHOLD.
ROBERT ZELL.